United States Patent

Kamin et al.

Patent Number: 5,405,671
Date of Patent: Apr. 11, 1995

[54] HOT OR COLD BUBBLE INSULATION SHEETING

[76] Inventors: Sam Kamin, 6500 Sands Point #513, Houston, Tex. 77074; George Spector, 233 Broadway Rm 702, New York, N.Y. 10279

[21] Appl. No.: 151,287

[22] Filed: Nov. 12, 1993

[51] Int. Cl.⁶ .............................................. B32B 9/00
[52] U.S. Cl. ...................................... 428/69; 428/68; 428/72; 428/76; 428/131; 428/132; 428/138; 428/166; 428/178; 428/184; 428/198; 428/913; 602/3; 602/75; 607/1; 607/96; 607/104; 607/108; 607/110
[58] Field of Search ............... 428/198, 137, 143, 138, 428/178, 166, 34.6, 184, 68, 72, 76, 131, 132, 913; 602/3, 75; 607/1, 96, 104, 108, 110

[56] References Cited

U.S. PATENT DOCUMENTS

| | | | |
|---|---|---|---|
| 4,368,725 | 1/1983 | McClintock | 126/432 |
| 4,959,111 | 9/1990 | Kruck et al. | 156/145 |
| 5,084,324 | 1/1992 | Schirmer | 428/139 |

Primary Examiner—Patrick J. Ryan
Assistant Examiner—Abraham Bahta

[57] ABSTRACT

An improved insulation wrap is provided with consists of a first layer of flexible material. A second layer of flexible material is secured to the first layer, so as to form a bubble sheeting having a plurality of cavities therebetween. A liquid with reflective particles is carried within the cavities. In one instance cold can be induced into the liquid and in another instance heat can be induced into the liquid, to maintain a desired temperature therein, depending on application and use of the bubble sheeting.

6 Claims, 2 Drawing Sheets

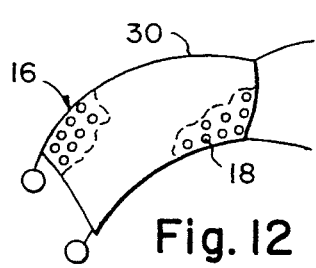
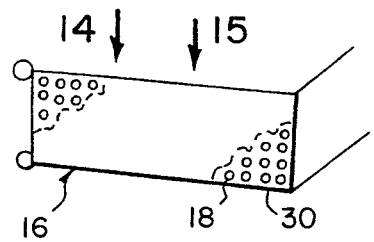
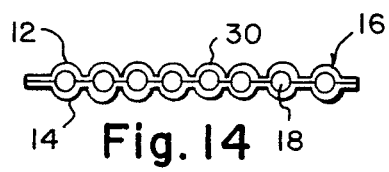
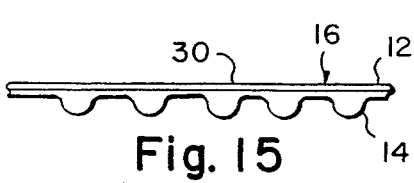
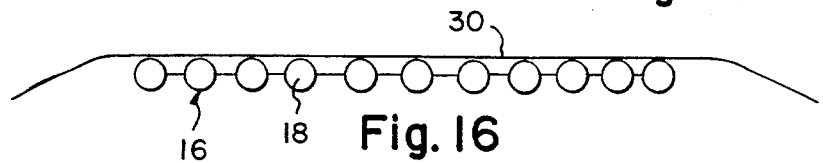
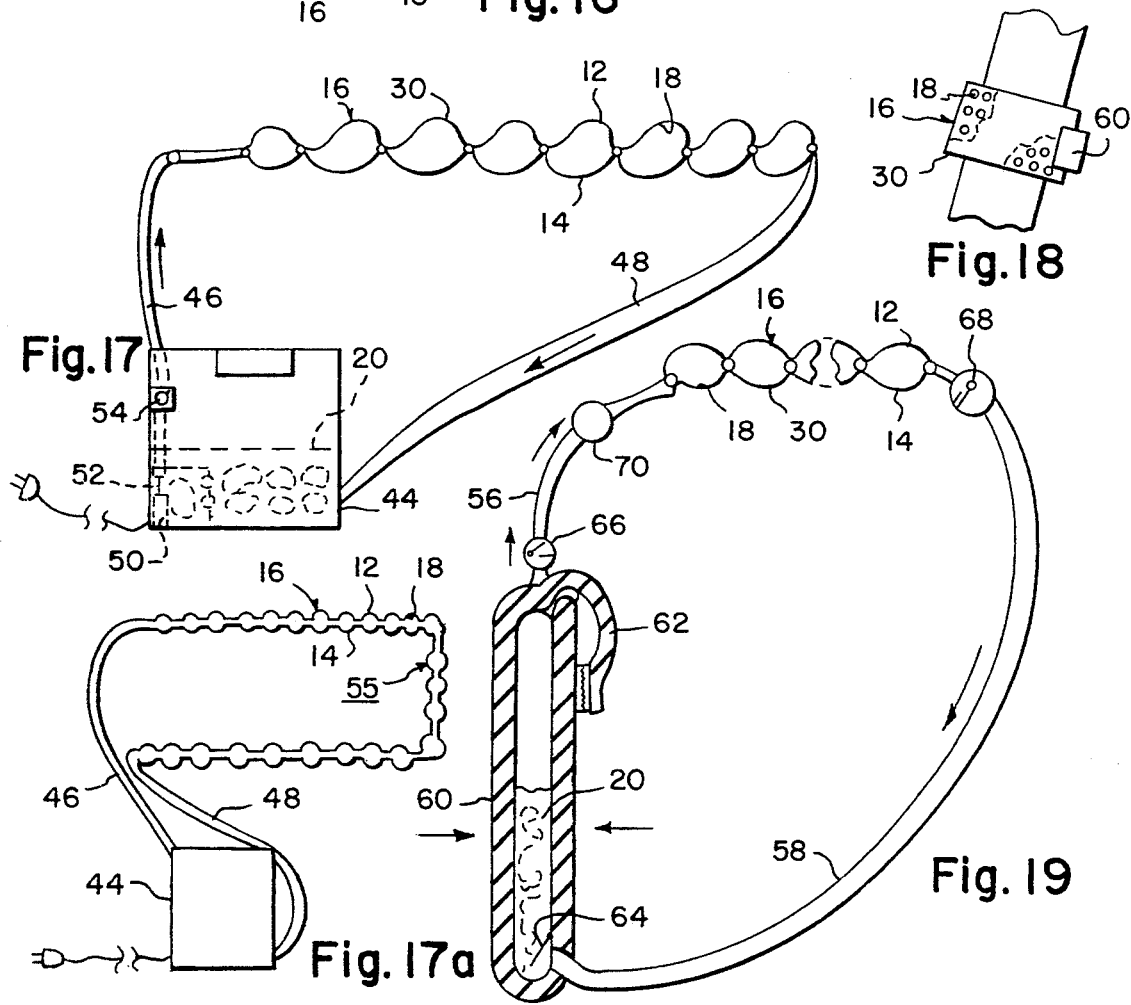

HOT OR COLD BUBBLE INSULATION SHEETING

BACKGROUND OF THE INVENTION

The instant invention relates generally to hot and cold insulators and more specifically it relates to an improved insulation wrap, which provides a structure to retain heat or cold over a long period of time.

There are available various conventional hot and cold insulators which do not provide the novel improvements of the invention herein disclosed.

SUMMARY OF THE INVENTION

A primary object of the present invention is to provide an improved insulation wrap that will overcome the shortcomings of the prior art devices.

Another object is to provide an improved insulation wrap that is bubble sheeting with liquid filled cavities, so as to in one instance induce cold into a structure and in another instance to induce heat into the structure, depending on its application and use.

An additional object is to provide an improved insulation wrap that will in one instance keep food at a desired temperature and in another instance be used as a bandage to keep a body part at a desired temperature to ease pain and swelling.

A further object is to provide an improve insulation wrap that is simple and easy to use.

A still further object is to provide an improved insulation wrap that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 12 is a perspective view of a curved bubble sheeting bandage.

FIG. 13 is a perspective view of a straight bubble sheeting bandage.

FIG. 14 is an end view taken in direction of arrow 14 in FIG. 13, showing the bubble extending on each side.

FIG. 15, is an end view taken in direction of arrow 15 in FIG. 13, showing the bubble extending on one side, whereby the smooth side is for skin contact.

FIG. 16 is a diagrammatic end view of the bubble sheeting with an extended exterior layer thereon.

FIG. 17 is a diagrammatic view of a circulating system for the bubble sheeting.

FIG. 17a is a diagrammatic view of a circulating system for the bubble sheeting in a sleeping bag type of configuration.

FIG. 18 is a diagrammatic view showing a bubble sheeting band on an arm with the pump built therein.

FIG. 19 is a diagrammatic view partly in section showing a modified circulating system for the bubble sheeting being manually operated.

DETAILED DESCRIPTION OF THE PREFERRED EMBODIMENTS

Figure 1:
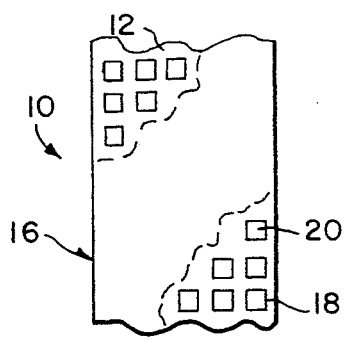
FIG. 1 is an elevational view of a piece of square cavity bubble sheeting.
Figure 2:
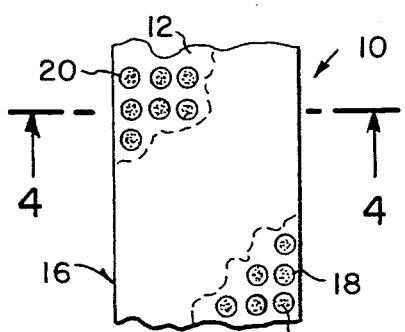
FIG. 2 is an elevational view of a piece of round cavity bubble sheeting.
Figure 3:
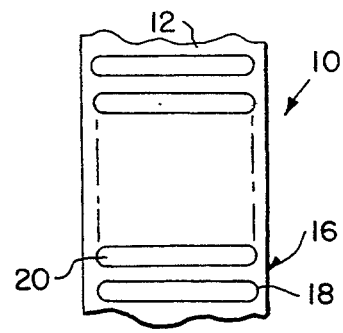
FIG. 3 is an elevational view of a piece of elongated cavity bubble sheeting.
Figure 4:
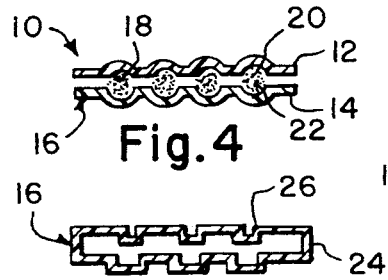
FIG. 4 is a cross sectional view with parts separated, taken along line 4—4 in FIG. 2.
Figure 7:
FIG. 7 is a cross sectional view taken along line 7—7 in FIG. 6 showing the top closure.
Figure 5:
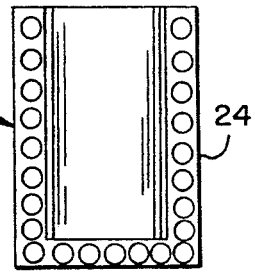
FIG. 5 is a diagrammatic cross sectional view of a cylindrical bag with a beverage can therein.
Figure 6:
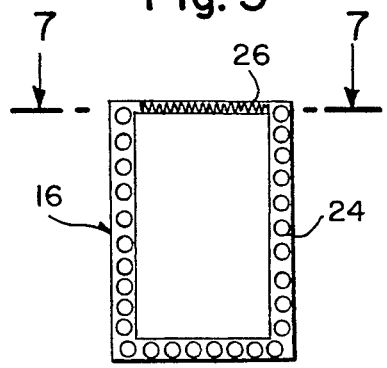
FIG. 6 is a diagrammatic elevational view of a bag with a top lock closure.
Figure 8:
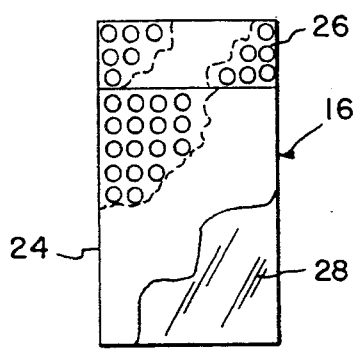
FIG. 8 is an elevational view of a bag with a flap and reflective material thereon.
Figure 11:
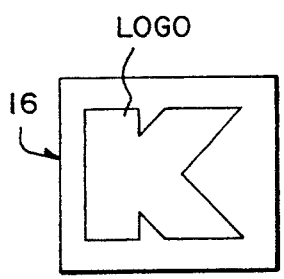
FIG. 11 is an elevational view showing a logo advertisement deployed onto the bubble sheeting.
Figure 9:
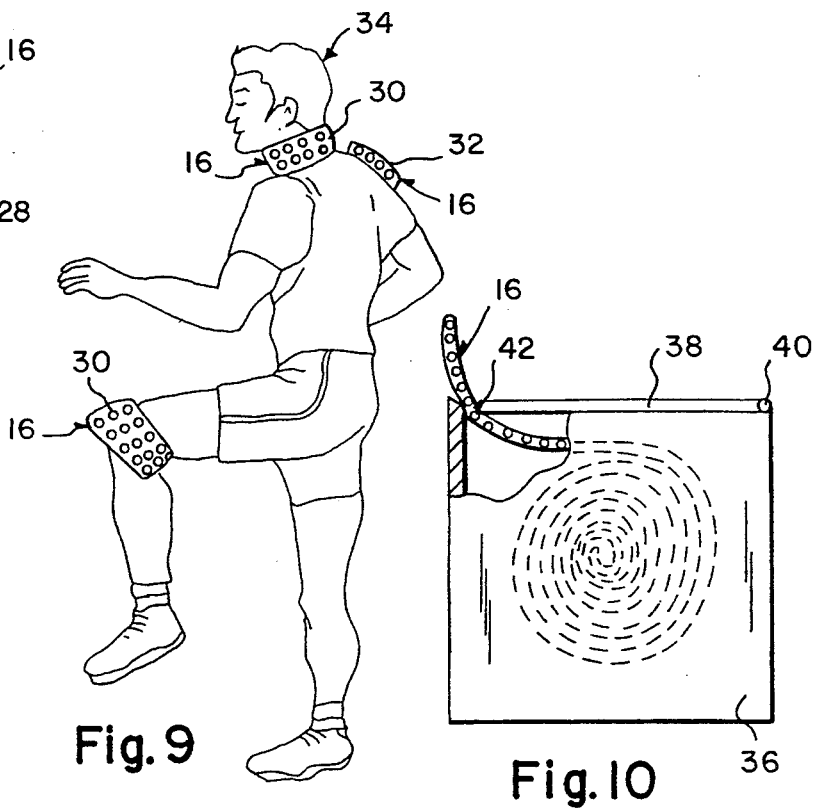
FIG. 9 is an elevational view of a person wearing a neck band, shoulder pad and knee band.

Turning now descriptively to the drawings, in which similar reference characters denote similar elements throughout the several views, FIGS. 1 through 4 illustrate an improved insulation wrap 10, which consists of a first layer of flexible material 12. A second layer of flexible material 14 is secured to the first layer 12, so as to form a bubble sheeting 16 having a plurality of cavities 18 therebetween. A liquid 20, such as distilled water with reflective particles 22 is carried within the cavities 18. In one instance cold can be induced into the liquid 20 and in another instance heat can be induced into the liquid 20, to maintain a desired temperature therein, depending on application and use of the bubble sheeting 16.

As shown in FIG. 5 through 8, the bubble sheeting 16 is shaped into a receptacle 24 for holding various types of foods therein. The receptacle 24 can contain a closure 26, being a top lock closure in FIG. 6 or a flap in FIG. 8, to seal the food within the receptacle 24. The receptacle 24 in FIG. 8, further includes reflective material 28 affixed thereto to reflect exterior heat therefrom.

The bubble sheeting 16 in FIGS. 9, 12 to 16 are shaped into a bandage 30 and a pad 32. It can be applied to various body parts of a person 34, to keep the body parts at a desired temperature to ease pain and swelling.

Figure 10:
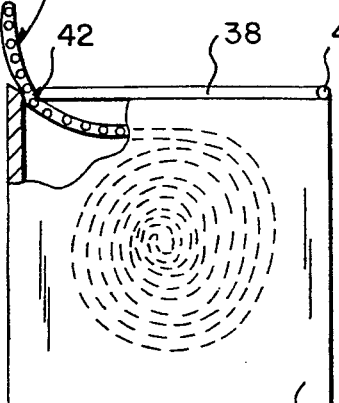
FIG. 10 is an elevational view with parts broken away of a freezer chest dispenser for rolled bubble sheeting.

A freezer chest 36 is shown in FIG. 10, for storing the bubble sheeting 18 in a rolled up state therein. A top lid 38 hinged at 40 to the freezer chest 36 has a cutting edge 42, so that a portion of the bubble sheeting 16 when pulled out from the freezer chest 36 can be cut off.

In FIG. 17, the cavities 18 are interconnected within the bubble sheeting 16. A housing 44 is fluidly connected via inlet tube 46 and outlet tube 48 to the interconnected cavities 18. An electronic pump 50 is within the housing 44, for circulating the liquid 20 through the interconnected cavities 18. A heating element 52 is within the housing 44 for heating the liquid 20 therein. A thermostat 54 is on the housing for regulating the heating element 52.

In FIG. 17a, the bubble sheeting 16 is in a sleeping bag configuration 55. A cold or freeze victim can be inserted into the bag 55 with warm or cooling liquid 20 circulating to protect and help the victim to recover or stabilize. A burn victim can also be inserted into the bag 55 to lower the burn temperature. In freeze or burn situations, the bag 55 will aid in stabilizing the person until medical treatment is given. The bag 55 can also be used in conjunction with medical treatment and is good for rescue actions.

In FIGS. 18 and 19, the cavities 18 are also interconnected within the bubble sheeting 16. An inlet tube 56 is fluidly connected to the bubble sheeting 16. An outlet tube 58 is fluidly connected to the bubble sheeting 16. A squeezable housing 60 is provided and is connected at a top end to the inlet tube 56 and at a bottom end to the outlet tube 58. A resealable flap 62 is on the top end of the housing 60, so as to allow the filling of the housing 60 with the liquid 20. A flap valve 64 is located in the bottom end of the housing 60 at the outlet tube 58. A first normally closed check valve 66 is located in the inlet tube 56 adjacent the top end of the housing 60. A second normally closed check valve 68 is located in the outlet tube 58 adjacent the bubble sheeting 16. When the housing 60 is squeezed, the liquid 20 will flow in one direction from the housing 60 into the bubble sheeting 16. A battery operated thermostat 70 is located in the inlet tube 56 between the first normally closed check valve 66 and the bubble sheeting 16. The thermostat 70 will open only at a predetermined temperature.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An improved insulation wrap which comprises:
   a) a first layer of flexible material;
   b) a second layer of flexible material secured in spaced relationship to said first layer, so as to form a bubble sheeting having a plurality of interconnected cavities therebetween; and
   c) a liquid with reflective particles carried within said cavities, so that in one instance cold can be induced into said liquid and in another instance heat can be induced into said liquid to maintain a desired temperature therein, depending on application and use of said bubble sheeting.

2. An improved insulation wrap as recited in claim 1, wherein said bubble sheeting is shaped into a receptacle for holding various types of foods therein; wherein said receptacle further including a closure along one side thereof, to better seal the food within said receptacle.

3. An improved insulation wrap as recited in claim 1, wherein said bubble sheeting is shaped into a bandage and a pad adapted for application to various body parts of a person, to keep the body parts at a desired temperature.

4. An improved insulation wrap as recited in claim 1, further including:
   a) a freezer chest for storing said bubble sheeting in a rolled up state therein; and
   b) a top lid hinged to said freezer chest and having a cutting edge, so that a portion of said bubble sheeting when pulled out from said freezer chest can be cut off.

5. An improved insulation wrap as recited in claim 3, further including:
   a) a housing fluidly connected to said interconnected cavities;
   b) an electronic pump within said housing for circulating said liquid through said interconnected cavities;
   c) a heating element within said housing for heating said liquid therein; and
   d) a thermostat on said housing for regulating said heating element.

6. An improved insulation wrap as recited in claim 3, further including:
   a) an inlet tube fluidly connected to said bubble sheeting;
   b) an outlet tube fluidly connected to said bubble sheeting;
   c) a squeezable housing connected at a top end to said inlet tube;
   d) a resealable flap on said top end of said housing, so as to fill said housing with said liquid;
   e) a flap valve located in said bottom end of said housing at said outlet tube;
   f) a first normally closed check valve located in said inlet tube adjacent said top end of said housing;
   g) a second normally closed check valve located in said outlet tube adjacent said bubble sheeting, so that when said housing is squeezed said liquid will flow in one direction from said housing into said bubble sheeting; and
   h) a battery operated thermostat located in said inlet tube between said first normally closed check valve and said bubble sheeting, whereby said thermostat will open only at a predetermined temperature.

* * * * *